United States Patent Office 3,208,271
Patented Sept. 28, 1965

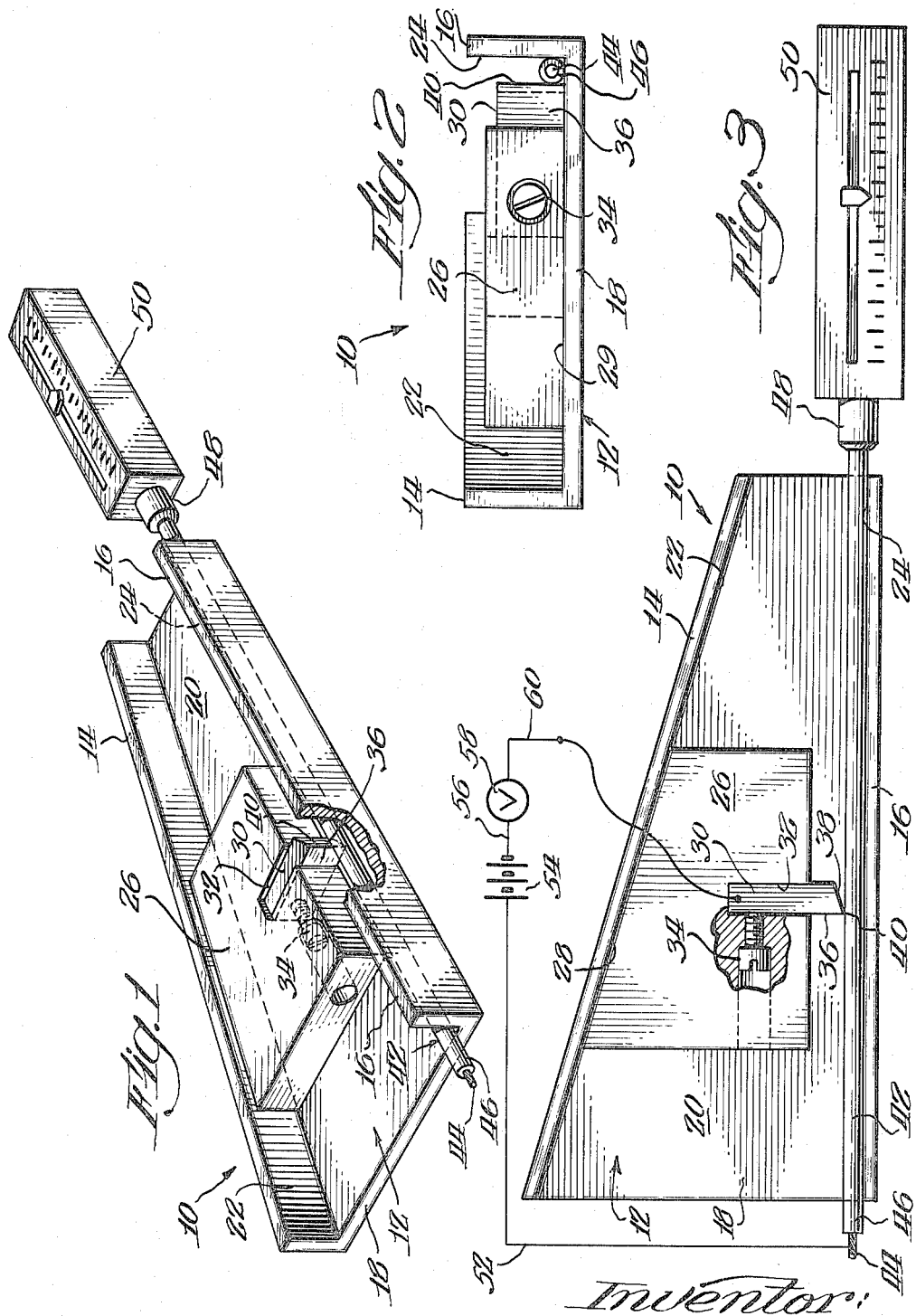

3,208,271
WIRE INSULATION TESTING APPARATUS
Neil L. Thompson, Royal Oak, Mich., assignor to Essex Wire Corporation, Fort Wayne, Ind., a corporation of Michigan
Filed July 10, 1963, Ser. No. 294,046
5 Claims. (Cl. 73—81)

This invention relates to apparatus for testing the cut-through resistance of insulated covering on insulated electrical wire.

An important characteristic in the selection of insulated wire for varying applications is the strength of the insulated covering of such insulated wire. One manner of evaluating such strength is to ascertain the resistance of the insulation to being cut through by a knife member.

An object of the present invention is to provide improved means, comprising both method and apparatus, for testing the cut-through resistance of plastic or fabric insulation on insulated wire.

Another object of the present invention is to provide novel wire insulation testing apparatus comprising a guide member having a tapered guideway therein within which wedge block means are slidably disposed, the wedge block having cutting means thereon adapted to penetrate the insulation upon application of tensile force to the insulated wire.

Yet another object of the present invention is to provide wire insulation testing apparatus which is simple to manufacture and which will reliably and automatically indicate complete cut-through of the insulation of the insulated wire being tested.

These and other objects, advantages, and functions of the invention will be apparent upon reference to the specification and to the accompanying drawings, in which like parts are identified by like reference symbols in each of the views, and in which:

FIGURE 1 is a perspective view of a wire insulation testing apparatus showing an insulated wire in position for testing;

FIGURE 2 is an end view of the wire insulation testing apparatus as viewed from the left side of FIGURE 1; and FIGURE 3 is a top plan view of the wire insulation testing apparatus illustrating its use in the testing of insulated wire.

Referring now to the drawing, there is shown a wire insulation testing apparatus, generally designated 10, embodying the features of the present invention. The testing apparatus 10 includes a guide member 12 which is preferably made of a single piece of metal suitably formed to shape. The guide member 12 is generally U-shaped in cross-section and has two side flanges 14 and 16 extending perpendicularly from the margins of a tapered body portion 18 to form a tapered or wedge-shaped channel or guideway having a plane face surface 20 and spaced side plane surfaces 22 and 24.

The face surface 20 of the bottom portion of body 18 and the side surface 22 on side flange 14 of body 18 provide means for guiding a wedge block 26 within the guide member 12. The wedge block 26 which may be formed of any suitable rigid material presents a sloping plane side surface 28 which is arranged to slide along the adjacent side surface 22 of the testing apparatus. The wedge block 26 also has a bottom plane surface 29 which is arranged to slide along the adjacent surface 20 of the testing device. The surfaces 20, 22, 28 and 29 may be suitably lubricated to reduce friction therebetween, or the surfaces may be formed from a plastic having self-lubricating properties, as for example, Teflon. If desired, rollers may be provided on the wedge block 26 or side wall 14 to minimize friction between the wedge block and the wall 14 of guide member 12.

Cutting means defined by a blade or cutting member 30, preferably formed of a hard metal, is carried in a slot 32 formed in the lower portion of the wedge block 26. A set screw 34 threaded in the wedge block 26 has its end applied against the side 36 of the blade 30 to hold the latter in adjusted position in the slot 32. The blade 30 preferably is rectangular in cross-section and is provided with an inclined surface 38 forming a cutting edge 40 at its junction with the side 36. It will be noted that the distance between the cutting edge 40 of the blade 30 and the side surface 24 of the guide member 12 is varied by sliding the wedge block 26 along the side surface 22.

In use of the wire insulation testing apparatus 10 of the present invention, the testing apparatus 10 is suitably held or supported on a table or the like with the bottom 18 of the guide member 12 positioned in a generaly horizontal plane and the block 26 resting upon the generally horizontal surface 20. With the cutting edge 40 of the blade 30 separated from the side surface 24, a length of insulated wire 42 comprising a conductor 44 and a covering 46 of insulating material is placed between the side surface 24 and the blade 30 with a portion of the wire 42 extending from the narrow end of the guide member. Obviously, the wedge block can be moved longitudinally within the channel-like guide member 12 to accommodate insulated wire of varying external diameter. The free end of the insulated wire 42 is gripped by a chuck 48 or other suitable means attached to a resilient tension-indicating means, such as a spring balance 50. The wedge block 26 is then shifted along the side surface 22 of the guide member 12 until the blade cutting edge 40 engages the outer surface of the covering 46 of the wire 42. With the wedge block 26 so positioned, a longitudinal tensile force is applied to the wire 42 by a steady pull of the spring balance tensioning means 50. The shape of the blade 30 and the shape and relation of the wedge block 26 and the guide member 12 are such that tension on the wire 42 causes the blade knife edge 40 to penetrate the covering 46 of the wire 42. The depth of penetration of the covering 46 is dependent upon the resistance to cutting of the covering 46 and the tensile force applied to the wire 42. Upon the application of a sufficiently great tensile force to the wire 42, the knife or cutting edge 40 will completely penetrate the covering 46.

To indicate the complete penetration of the cutting edge 40 of blade 30 through the covering 46 to the conductor 44, a bared end of the conductor 44 is connected by a wire 52 to a battery 54 which is in turn connected by a wire 56 to an indicating device 58 such as a voltmeter or electric lamp. The indicating device 58 is connected by a wire 60 to the blade 30 which is formed of a conductive material. The electric circuit is automatically completed when the cutting edge 40 of the blade 30 cuts completely through the covering 46 and engages the conductor 44 of the insulated wire 42. As a wire 42 is being tested, the indicating device 58 will be observed to note when the covering 46 has been completely cut through. The tensile force required to cause complete penetration of the covering 46 to the conductor 44 by the cutting edge 40 will be indicated by the spring balance 50. As a matter of convenience the spring balance 50 may be of a well-known type having suitable indicia thereon for registering the maximum force during use.

In the wire insulation testing device herein disclosed, the side 36 of the blade 30 extends substantially perpendicularly to the side surface 24 of the guide member 12 while the inclined surface 38 of the blade 30 is inclined at an angle of approximately 15° relative to the side surface 24. The side surface 22 of the guide member 12 is also inclined at an angle of approximately 15° relative to the other side surface 24. These angles have been found satisfactory for the testing of low-voltage insulated wire of either the stranded or solid conductor type have a thermoplastic insulating covering such as polyvinyl chloride resin of 1/32 to 1/16 inch thick. For the testing of wire having other types of insulating covering of greater thickness, the above-mentioned angles may be varied to provide optimum test conditions.

The above description is concerned with a specific form of wire testing apparatus which has been found simple but effective in determining the force to cut through the insulating covering of wire and comparing the cut-through resistance of different wires. Modifications may, of course, be made to the particular embodiment of the invention herein shown and described and it is desired to protect all embodiments of the herein disclosed inventive concept within the scope of the appended claims.

I claim:

1. A wire insulation testing apparatus for insulated wire including a metallic conductor and an insulation covering said testing apparatus comprising a guide member having two planar side walls disposed at an angle to one another and converging toward one end of the guide member so as to define a tapered guideway therein, wedge block means slidable in said guideway against a side wall thereof, knife means affixed to said wedge block means for cutting through the insulation covering of said insulated wire, said insulated wire being disposed between said knife means and said guide member, resilient-tensioning means including a force indicator disposed adjacent said one end of said guide member for applying a longitudinal force to said insulated wire to cause cutting of the insulation covering of said insulated wire by said knife means, and electrical indicating means operatively connected to said insulated wire for indicating when the knife means has completely penetrated the insulation covering and engaged said metallic conductor.

2. A wire insulation testing apparatus for insulated wire comprising a channel-like guide member formed with a bottom wall and generally planar side walls tapering with respect to one another toward one end of said bottom wall, wedge block means disposed in the guide member and slidable therein against the bottom wall and one side wall, said wedge block means being constructed and arranged to receive the insulated wire between the wedge block means and said other side wall, cutting means affixed to said wedge block means for cutting the insulation on said insulated wire, said insulated wire being disposed between said bottom wall and said cutting means, spring-balance tensioning means having a force indicator thereon disposed adjacent said one end of said guide member for applying tensile force to the insulated wire to cause penetration of the insulation by the cutting means, and indicating means operatively connected to said insulated wire for indicating when the cutting means has completely penetrated the insulation on said insulated wire.

3. A wire insulation testing apparatus as in claim 2, wherein the cutting means comprises a knife member having a cutting edge formed thereon at the intersection of two surfaces, with the cutting edge being operative to cut the insulation when a longitudinal force is applied to the insulated wire in the direction of said one end of said guide member.

4. A wire insulation testing apparatus as in claim 2, wherein one side wall of the guide member lies in a plane which is substantially parallel to a vertical plane passing through the longitudinal axis of the guide member and a vertical plane passing through the other side wall intersects the plane of the first side wall at an angle of about fifteen degrees.

5. A wire insulation testing apparatus as in claim 2, wherein said indicating means comprises an indicator in an electrical circuit which is actuated upon completion of a circuit when the cutting means completely penetrates the insulation on the insulated wire.

References Cited by the Examiner

UNITED STATES PATENTS

| | | | |
|---|---|---|---|
| 2,054,529 | 9/36 | Wiggins | 81—9.51 |
| 2,372,093 | 3/45 | Leape et al. | 73—7 |
| 2,373,115 | 4/45 | Graves | 73—7 |
| 2,498,265 | 2/50 | Green | 73—150 |
| 2,676,381 | 4/54 | Holmes | 73—103 X |
| 2,718,779 | 9/55 | McLean | 73—7 |

RICHARD C. QUEISSER, *Primary Examiner.*

DAVID SCHONBERG, *Examiner.*